United States Patent [19]

Montero

[11] Patent Number: 5,773,946
[45] Date of Patent: Jun. 30, 1998

[54] APPARATUS FOR AND METHOD OF AUTOMATICALLY CONTROLLING OPERATION AND SPEED OF WINDSHIELD WIPERS

[76] Inventor: Fabián Montero, C/ Lirio, 23 - Cobeña, 28863 Madrid, Spain

[21] Appl. No.: 615,878

[22] Filed: Mar. 14, 1996

[51] Int. Cl.$^6$ ....................................................... G05B 5/00
[52] U.S. Cl. ..................... 318/460; 318/483; 318/DIG. 2
[58] Field of Search ............................. 318/DIG. 2, 460, 318/483; 73/861.18, 861.25, 861.26

[56] References Cited

U.S. PATENT DOCUMENTS

| Re. 33,848 | 3/1992 | Shiraishi | 318/444 |
|---|---|---|---|
| 4,603,316 | 7/1986 | Kobayashi et al. | 340/52 R |
| 4,843,275 | 6/1989 | Radice | 310/334 |
| 4,949,385 | 8/1990 | Murphy | 381/118 |
| 5,119,002 | 6/1992 | Kato et al. | 318/444 |
| 5,528,224 | 6/1996 | Wang | 340/583 |

*Primary Examiner*—Brian Sircus
*Attorney, Agent, or Firm*—Haverstock & Owens LLP

[57] ABSTRACT

An automatic windshield wiper control system detects and monitors impacts on a vehicle's surface due to water drops in order to automatically and appropriately control the speed of the windshield wipers. Preferably, the automatic control system is activated when the manual windshield wiper control is switched to the intermittent setting. An operator can still manually select the slow and fast continuous speed settings of the windshield wipers. An acoustic sensor is mounted behind an exterior surface of the vehicle, preferably the outer casing of a side rear-view mirror. The acoustic sensor detects noises due to impacts on the surface and generates an electrical signal representing the impact noises. The electrical signal from the acoustic sensor is filtered, thereby electronically isolating the frequency components due to the impacts of water drops and creating a filtered signal. A voltage signal is then formed representative of the frequency of the impacts of water drops on the surface. When the automatic control system is activated, the speed of the windshield wipers is controlled based on the level of the voltage signal. The voltage signal is compared to first and second threshold values. If the voltage signal rises above the first threshold value, a single sweep function of the windshield wipers is automatically activated. When the voltage signal rises above the second threshold value, a continuous fast sweep function of the windshield wipers is automatically activated.

25 Claims, 4 Drawing Sheets

Figure 4

APPARATUS FOR AND METHOD OF AUTOMATICALLY CONTROLLING OPERATION AND SPEED OF WINDSHIELD WIPERS

FIELD OF THE INVENTION

The present invention relates to the field of detecting a presence of water on a vehicle's windshield. More particularly, the present invention relates to the field of controlling the operation and speed of one or more windshield wipers in response to the detection of the presence of water on a vehicle's windshield.

BACKGROUND OF THE INVENTION

Windshield wipers are used on a vehicle to clear water from the windshield of the vehicle, thereby allowing the operator of the vehicle to see clearly through the windshield during rainfall or when water is otherwise dispensed onto the windshield during operation of the vehicle. Water is delivered to the windshield from many different sources including snowfall, rainfall and the movement of other vehicles through standing water. When activated, the windshield wipers move across the windshield in a sweeping manner. During a sweep across the windshield a rubber blade of the wiper makes contact with a surface of the windshield and pushes water off of the windshield. The speed at which the wipers are swept across the windshield is typically controlled by the operator and selected in response to the travelling speed of the vehicle and the environmental conditions around the vehicle.

The windshield wiper controls for a typical vehicle include settings for a number of continuous speeds and a number of intermittent speeds. When the controls are set to operate the windshield wipers at one of the continuous speeds, the windshield wipers are active at all times, and move continuously at a set speed, thereby clearing water from the windshield at a rate determined by the speed of their motion. A continuous speed is generally used during heavy rainfall or when conditions otherwise require something more than an intermittent speed. When the controls are set to one of the intermittent speeds, the windshield wipers are delayed between each sweep, thereby clearing water from the windshield only during an active sweep motion. The delay between each sweep motion is different for each intermittent speed. An intermittent speed is generally used when there is a light rainfall or when conditions require something less than a continuous speed.

The windshield wipers are typically controlled and the speeds are set manually by the operator of the vehicle. As the speed of the vehicle or environmental conditions change during operation of the vehicle, changing the rate at which water accumulates on the windshield, the operator must change the speed setting of the windshield wipers. This causes the operator of the vehicle to divert their attention from the road in front of them while changing the setting of the windshield wiper controls, thereby creating a momentary unsafe operating condition. If the rain starts falling more heavily, there will also be a period of time, between when the conditions change and when the speed of the wipers is reset, during which the windshield is not clear to see through. Such a situation can be very dangerous when travelling in a vehicle at high speeds.

As featured in Car and Driver magazine, General Motors has developed a "Rainsense" system, which is used on the Cadillac line of automobiles, for automatically selecting the speed of the windshield wipers. [Car and Driver, October 1995, page 69] This system automatically selects the wiper speed required to keep the windshield clear by sensing the presence and amount of rain on the windshield. A series of eight light-emitting diodes are positioned to shine at an angle onto the inside of the windshield glass. When dry, the outer surface of the windshield will reflect the light from the diodes back into a series of collectors. When the windshield is wet however, the drops of water refract some of the light from the diodes away from the collectors. This absence of the light is detected by the collectors and the windshield wipers are set into a motion or sweep across the windshield. When water is again detected on the windshield through the absence of light reflected into the collectors, another sweep of the windshield wipers is initiated. To activate the system, the operator of the vehicle switches the wiper controls to an automatic setting. With the "Rainsense" system, the high and low speed continuous settings can still be selected manually. In the "Rainsense" system, the windshield wipers are only activated once water is detected on the windshield.

What is needed is an automatic windshield wiper control system which detects the amount of water coming into contact with the car and automatically controls the windshield wipers based on an amount of water detected. What is also needed is an automatic windshield wiper control system which controls the speed of the windshield wipers according to the rate at which water is accumulating on the windshield.

SUMMARY OF THE INVENTION

An automatic windshield wiper control system detects and monitors impacts on a vehicle's surface due to water drops in order to automatically and appropriately control the speed of the windshield wipers. Preferably, the automatic control system is activated when the manual windshield wiper control is switched to the intermittent setting. An operator can still manually select the slow and fast continuous speed settings of the windshield wipers. An acoustic sensor is mounted behind an exterior surface of the vehicle, preferably the outer casing of a side rear-view mirror. The acoustic sensor detects noises due to impacts on the surface and generates an electrical signal representing the impact noises. The electrical signal from the acoustic sensor is filtered, thereby electronically isolating the frequency components due to the impacts of water drops and creating a filtered signal. A voltage signal is then formed representative of the frequency of the impacts of water drops on the surface. When the automatic control system is activated, the speed of the windshield wipers is controlled based on the level of the voltage signal. The voltage signal is compared to first and second threshold values. If the voltage signal rises above the first threshold value, a single sweep function of the windshield wipers is automatically activated. When the voltage signal rises above the second threshold value, a continuous fast sweep function of the windshield wipers is automatically activated.

DETAILED DESCRIPTION OF THE PREFERRED EMBODIMENT

An automatic windshield wiper control system uses an acoustic sensor to detect the presence of water on the windshield of the vehicle. The acoustic sensor is preferably mounted within the plastic covering of a mirror on the side of the vehicle. Alternatively, the acoustic sensor can be mounted in any appropriate location on the vehicle within the general vicinity of the windshield, including behind the windshield itself. The acoustic sensor detects the impact of water drops on the surface which it is mounted behind. When the windshield wiper controls are set to operate at an intermittent speed, the signal from the acoustic sensor, representing a frequency of impacts of water drops on the mirror casing, is converted to a voltage signal having a level representing the frequency of the impact of water drops on the surface. The level of this voltage signal is monitored.

When the level of the voltage signal rises above a first predetermined threshold level, the single sweep function of the windshield wiper control is activated to shorten the delay interval between each sweep of the wipers. If the level of the voltage signal rises above a second predetermined threshold level, the continuous fast speed function of the windshield wiper control is activated. The continuous fast speed of the wipers is maintained until the level of the voltage signal falls below the second predetermined threshold level. The single sweep function of the wipers is then maintained until the level of the voltage signal falls below the first predetermined threshold level or the voltage signal again rises above the second predetermined threshold level. Each time the voltage signal rises above the second predetermined threshold level, the continuous fast speed of the wipers is activated and maintained until the level of the voltage signal falls below the second predetermined threshold level. When the level of the voltage signal falls below the first predetermined threshold level, the windshield wipers will remain at the intermittent speed setting until the operator of the vehicle switches the windshield wiper controls to the off setting or the voltage signal rises above the first predetermined threshold level. Each time the voltage signal rises above the first predetermined threshold level, the single sweep function of the wipers is activated and maintained until the level of the voltage signal falls below the first predetermined threshold level. When the level of the voltage signal constantly remains below the first predetermined threshold level the windshield wipers will then remain at the intermittent speed setting until the operator of the vehicle switches the windshield wiper controls to the off setting. By automatically controlling the changing of wiper speeds as the amount of water hitting the vehicle changes, the automatic control system of the present invention ensures that the windshield is clear during operation in wet changing conditions, without requiring the operator's attention.

The automatic windshield wiper control system of the present invention operates in parallel with the manual operation of the windshield wipers, thereby giving the operator of the vehicle the ability to also manually control the windshield wipers. In the preferred embodiment of the present invention, in order to activate the automatic control system, the operator switches the manual controls to an intermittent setting. Alternatively, a water detection system can be used to automatically activate the automatic control system when water is first detected on the windshield. In this alternate embodiment, a manual override setting is included to deactivate the automatic control system during times when operation of the windshield wipers would result in their damage, such as when the vehicle is inside a car washing machine.

As described above, in the preferred embodiment of the automatic control system of the present invention, there are two threshold levels at which the speed of the windshield wipers are controlled. As will be apparent to those skilled in the art, additional threshold levels can be added to provide for the automatic control of additional windshield wiper sweep speeds.

Figure 1A:
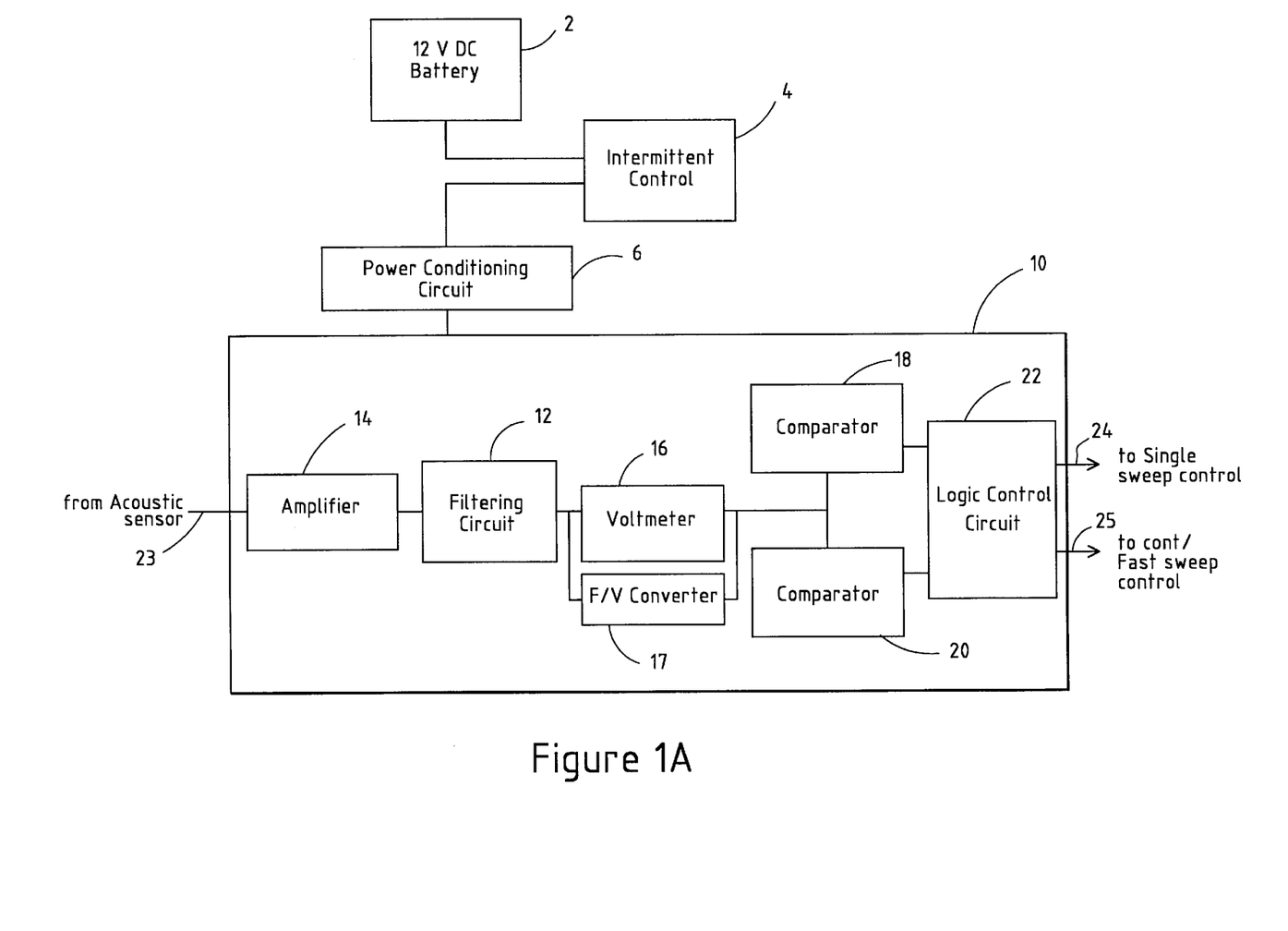
FIGS. 1A and 1B illustrate block diagram schematics of an automatic control circuit according to the present invention.

A block diagram schematic of an automatic control circuit 10 according to the preferred embodiment of the present invention is illustrated in FIG. 1A. A signal line 23 from the acoustic sensor is coupled to the input of an amplifier circuit 14. An output of the amplifier circuit 14 is coupled to the input of a filtering circuit 12. An output of the filtering circuit 12 is coupled to the input of a voltmeter circuit 16. An output of the voltmeter circuit 16 is coupled to the inputs of comparators 18 and 20. An output of the comparator 18 is coupled as an input to a logic control circuit 22. An output of the comparator 20 is also coupled as an input to the logic control circuit 22. A signal line 24 is coupled between a first output of the logic control circuit 22 and a single sweep activation control circuit. A signal line 25 is coupled between a second output of the logic control circuit 22 and a continuous fast sweep activation control circuit.

A battery 2 of the vehicle is coupled to the intermittent control circuit 4. When the intermittent control circuit 4 is manually activated by the operator, then power is provided from the battery 2 to a power conditioning circuit 6. The power conditioning circuit 6 is coupled to provide power to the components of the automatic control system circuit 10.

Figure 1B:
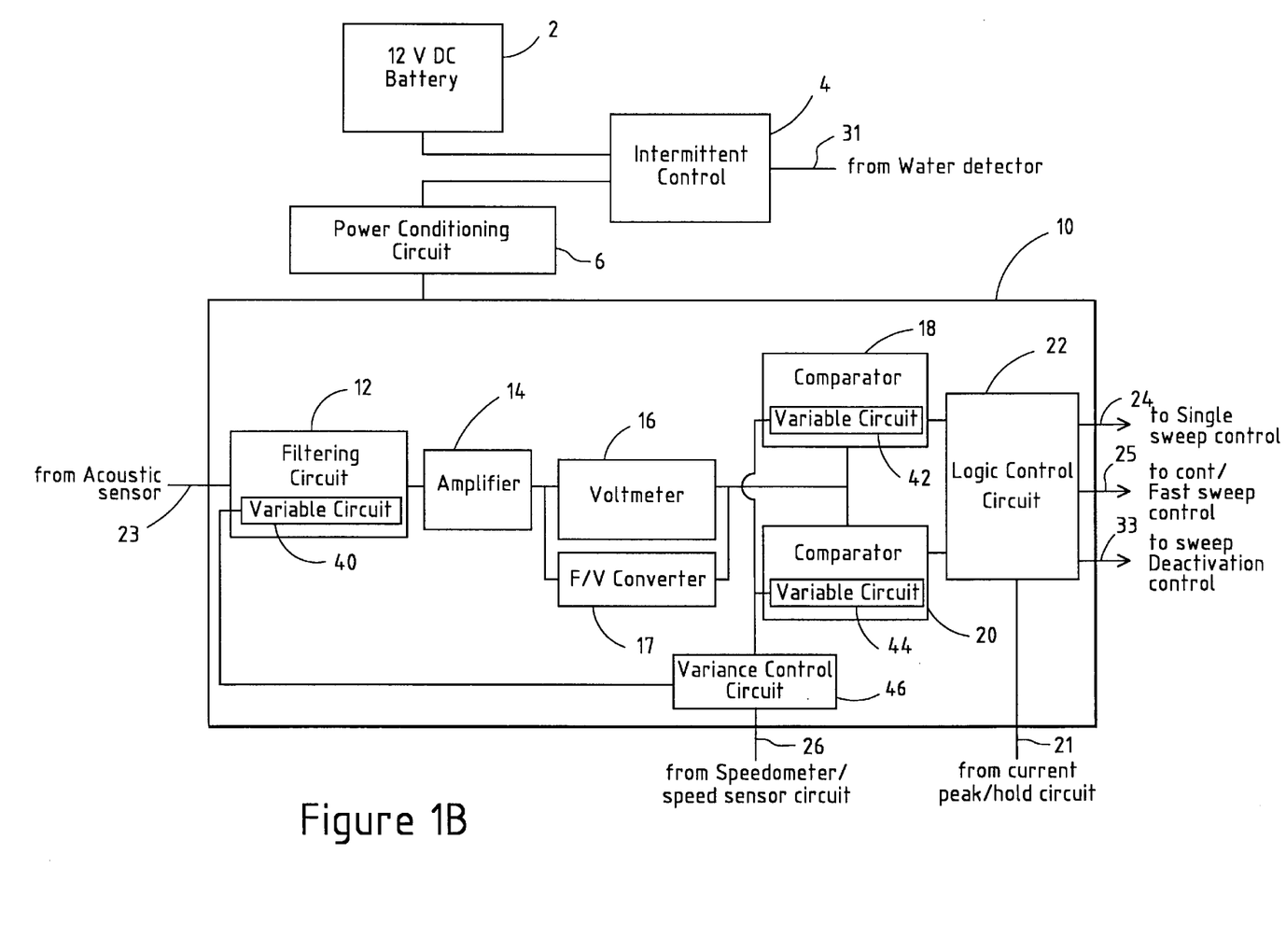

In an alternate embodiment, as illustrated in FIG. 1B, the order of the filtering circuit 12 and the amplifier circuit 14 is reversed. The signal line 23 from the acoustic sensor is coupled to an input of the filtering circuit 12. The output of the filtering circuit 12 is coupled to the input of the amplifier circuit 14. The output of the amplifier circuit 14 is coupled to the input of the voltmeter circuit 16. As in the embodiment illustrated in FIG. 1A, the output of the voltmeter 16 is coupled to the inputs of the comparators 18 and 20, the outputs of the comparators 18 and 20 are coupled to the inputs of the logic control circuit 22, the first output of the logic control circuit 22 is coupled to the single sweep activation control circuit and the second output of the logic control circuit 22 is coupled to the fast sweep activation control circuit.

In this alternate embodiment illustrated in FIG. 1B, the filtering circuit 12 includes a variable circuit 40. The comparator 18 includes a variable circuit 42. The comparator 20 includes a variable circuit 44. The variable circuits 40, 42 and 44 are coupled together and to a speedometer or speed sensor circuit by the signal line 26. Alternatively, the signal line 26 from the speedometer or speed sensor circuit is coupled to a variance control circuit 46. The variance control circuit 46 is coupled to the variable circuits 40, 42 and 44 to control the variation of the operation of the filtering circuit 12 and the comparators 18 and 20, respectively, as will be described below. A signal line 21 is coupled between an actuator peak hold circuit and an input of the logic control circuit 22. A signal line 33 is coupled between a third output of the logic control circuit 22 and a sweep deactivation control circuit.

In a further alternate embodiment, the voltmeter circuit 16 is replaced with a frequency-to-voltage converter circuit 17 which is coupled between the filtering circuit 12, in the embodiment of FIG. 1A, or the amplifier circuit 14, in the embodiment of FIG. 1B, and the comparators 18 and 20. In a still further alternate embodiment, the voltmeter 16 and the frequency-to-voltage converter 17 are coupled together in parallel and used in combination. In the embodiment as illustrated in FIG. 1A, the output of the filtering circuit 12 is coupled to both the input of the voltmeter 16 and the input of the frequency-to-voltage converter circuit 17. The outputs of the voltmeter 16 and the frequency-to-voltage converter circuit 17 are combined and coupled to the input of both of the comparators 18 and 20. In the embodiment as illustrated in FIG. 1B, the output of the amplifier circuit 14 is coupled to both the input of the voltmeter 16 and the input of the frequency-to-voltage converter circuit 17. The outputs of the voltmeter 16 and the frequency-to-voltage converter circuit 17 are combined and coupled to the input of both of the comparators 18 and 20. As will be apparent to those skilled in the art, the combination of the voltmeter 16 and the frequency-to-voltage converter circuit 17, operating in parallel, will require additional circuitry within the automatic control circuit 10. However, this combination will enhance the performance of the windshield wiper automatic control system in the presence of a wider range of different rainfall conditions.

Figure 2:
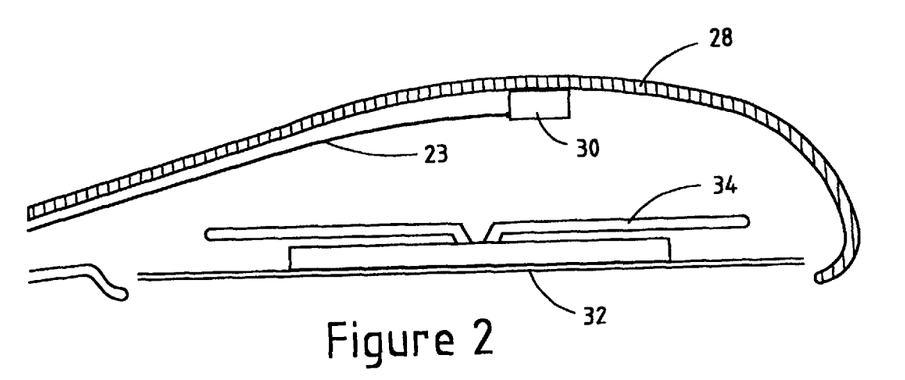
FIG. 2 illustrates the preferred placement of the acoustic sensor of the present invention within a side rear-view mirror casing.

The preferred placement of the acoustic sensor within a side rear-view mirror casing is illustrated in FIG. 2. The side rear-view mirror casing is typically mounted to the side of the vehicle in the front allowing the operator line-of-sight access to the mirror. The side rear-view mirror casing includes a plastic outer casing 28 which faces the front of the vehicle and holds the mirror 32. A mirror holder 34 is used to hold the mirror 32. The acoustic sensor 30 is preferably mounted in the outer casing of the mirror on the operator's side of the vehicle which faces oncoming traffic in order to also detect the impact of water drops caused by the passing of oncoming vehicles.

The acoustic sensor 30 is coupled to the interior of the outer casing 28 facing towards the front of the vehicle. The signal line 23 is coupled between the acoustic sensor 30 and the automatic control circuit 10.

In the preferred embodiment of the present invention the acoustic sensor 30 is a small unidirectional microphone which can withstand long term exposure to both very low and very high temperatures. The acoustic sensor 30 is affixed to the interior of the outer casing 28 of the side rear-view mirror facing towards the front of the vehicle. The acoustic sensor 30 senses the noise of all impacts made on the casing 28 including the noise attributable to the impact of water drops. The impacts attributable to water drops are naturally amplified by the plastic box structure of the outer casing 28 better than other sensed noises, in a well defined frequency range.

Figure 5:
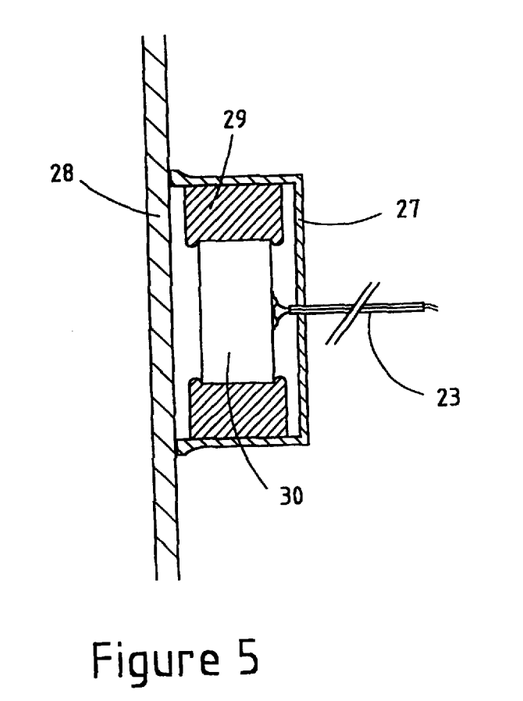
FIG. 5 illustrates an alternate embodiment of the present invention including the acoustic sensor positioned within a housing in a side rear-view mirror casing.

Preferably, as illustrated in FIG. 5, the acoustic sensor 30 is positioned within a housing 27. Within the housing 27, the acoustic sensor 30 is isolated from continuous low frequency vibration by a rubber ring 29 which surrounds the acoustic sensor 30 and provides a barrier between the acoustic sensor 30 and the housing 27. The housing 27 is affixed to the interior of the outer casing 28 by a rigid cyanacrilate adhesive material. The acoustic sensor 30 is positioned towards the front of the vehicle, not in direct contact with the outer casing 28. The back body of the acoustic sensor 30 is in this way properly isolated to eliminate the internal noise of the outer casing 28 caused by turbulence of wind behind the mirror 32 and mirror holder structure 34, the noise from the vehicle and other external noise. The back body of the acoustic sensor 30 should also protect against humidity and possible water condensation. Preferably, the body of the acoustic sensor 30 is hermetically sealed against the interior of the outer casing 28 of the side rear-view mirror, thereby enhancing the unidirectional characteristic of the acoustic sensor 30 to capture only the noise produced on the surface of the outer casing 28. Alternatively, the acoustic sensor 30 is affixed directly to the interior of the outer casing 28 by a rigid cyanacrilate adhesive material to ensure a good acoustic conduction from the outer casing 28 to the acoustic sensor 30.

The aerodynamic shape of the outer casing 28 typical for many vehicles, provides for a low influence of wind noise from the movement of the vehicle on the outer casing structure 28. The noise due to wind and other conditions is produced at frequencies lower than the frequency attributable to the impact of water drops on the outer casing 28. As will be discussed below it has been determined experimentally that the impact of water drops on the outer casing 28 is measured at frequencies above six kilohertz for a specific model of automobile. The frequency of signals due to other external noise has been determined to be lower than six kilohertz for the specific model of automobile. It should be apparent to those skilled in the art that the noise due to the impact of water on the outer casing 28 for different model vehicles will be sensed at different frequencies depending on the size, shape and other characteristics of the vehicle.

Power is supplied to the automatic control circuit 10 from the battery 2 when the operator of the vehicle selects the intermittent control setting. The power conditioning circuit 6 converts and conditions the power supply signal before it is provided to the automatic control circuit 10. Typically, the power provided from the vehicle's battery 2 is twelve-volt DC power. This power supply signal must be filtered and converted to a power signal at the required voltage values before it is supplied to the components within the automatic control circuit 10. The power conditioning circuit 6 filters the power signal from the battery 2, thereby eliminating noise and protecting the automatic control circuit from transients due to static electric charge and the switching of other electric devices within the vehicle. The power conditioning circuit 6 also performs a DC-to-DC conversion of the power supply signal from the battery 2 to obtain the voltage values necessary for the components of the automatic control circuit 10.

The signal from the acoustic sensor 30 is converted to a floating signal before it is provided to the automatic control circuit 10. The signal from the acoustic sensor 30 is converted to a floating signal to eliminate interference from the vehicle's electrical system.

Figure 3:
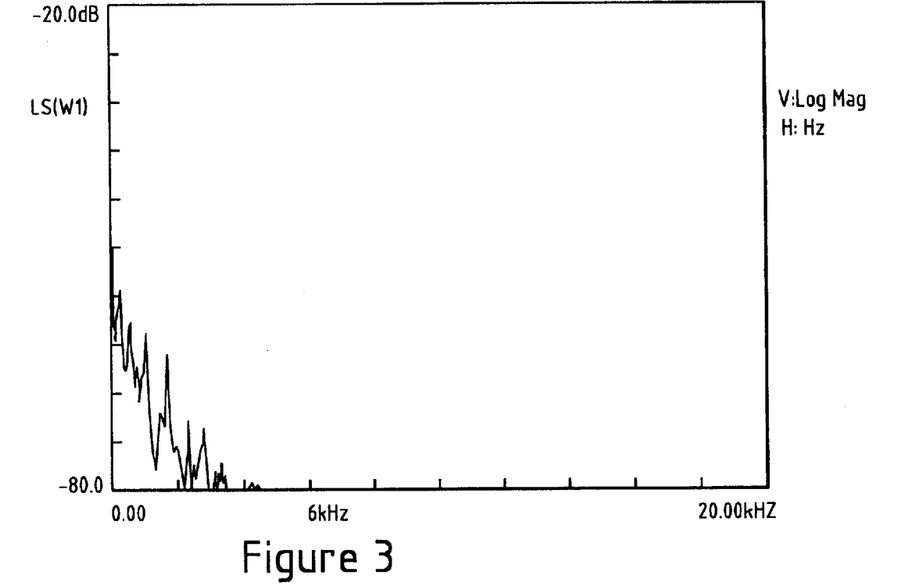
FIG. 3 illustrates a frequency domain graph of an electrical signal representing the noise detected by the acoustic sensor in dry conditions in a vehicle travelling at 100 kilometers per hour.
Figure 4:
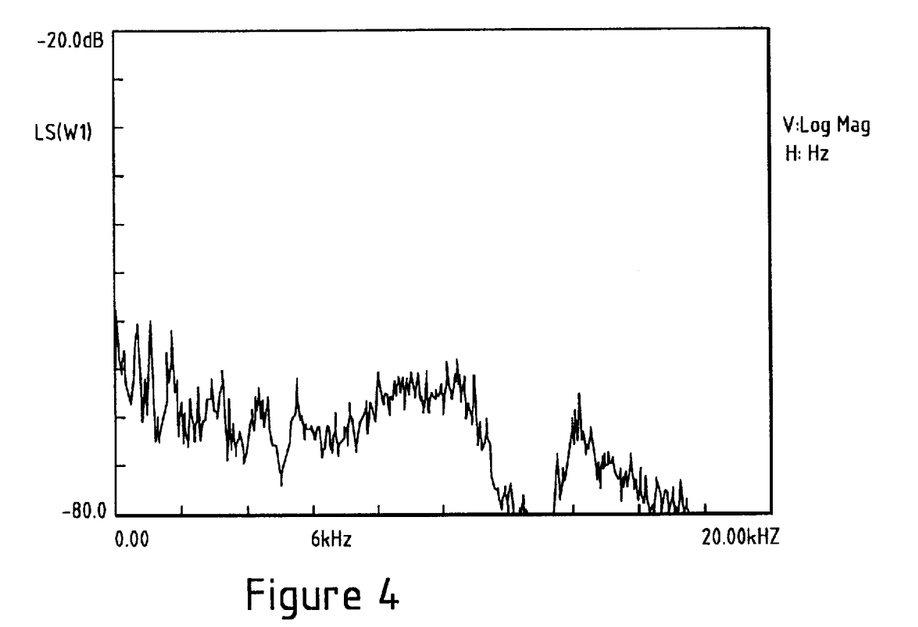
FIG. 4 illustrates a frequency domain graph of an electrical signal representing the noise detected by the acoustic sensor in wet conditions in a vehicle travelling at 100 kilometers per hour.

The filtering circuit 12 is designed to eliminate noise from the output signal of the acoustic sensor 30 which is not attributable to the impact of water drops on the outer casing 28. The preferred embodiment of the present invention has been designed for a "Saab 900" automobile. It has been determined experimentally that environmental noise not attributable to impact from water drops has a low amplitude in frequencies above six kilohertz. FIG. 3 illustrates a graph of noise detected in dry conditions in a vehicle travelling at 100 kilometers per hour. As illustrated, the frequencies of the detected noise, not attributable to the impact of water drops, are below six kilohertz. FIG. 4 illustrates a graph of noise detected in wet conditions in a vehicle travelling at 100 kilometers per hour. As illustrated, noise was detected at frequencies above and below six kilohertz. The noise detected at frequencies above six kilohertz is therefore attributable to the impact of water drops on the outer casing 28. Therefore, for a "Saab 900" model automobile the critical frequency band which characterizes impacts of water drops on the outer casing 28 is a frequency band above six kilohertz. The graph illustrated in FIG. 4 shows that the frequency region between six and twelve kilohertz determines the signal frequency components which correspond to and distinguish the noise due to impacts of water drops on the outer casing 28 for a "Saab 900" model automobile. It should be apparent to those skilled in the art that other models of vehicles may have different critical frequencies which can readily be determined experimentally.

In the preferred embodiment of the present invention, the filtering circuit 12 is a high pass filter which filters out frequencies below the critical frequency of six kilohertz, thereby isolating only the portion of the signal attributable to the impact of water drops. Depending on the characteristics of different models of vehicles, the filtering circuit can alternatively include a bandpass filter or a combination of highpass and bandpass filters. In a further alternate embodiment, the filtering circuit 12 includes a variable circuit 40, as illustrated in FIG. 1B, for the active variation of the cutoff frequency of the highpass or bandpass filters, or the active variation of the cutoff frequency of the combination of highpass and bandpass filters. It should be apparent to those skilled in the art that the variable circuit 40 can be included within any embodiment of the filtering circuit 12. The variable circuit 40 will vary the cutoff frequency of the filtering circuit 12 according to the travelling speed of the vehicle. The travelling speed of the vehicle is input to the variable circuit 40 from the vehicle's speedometer or a speed sensor circuit, on the signal line 26. Alternatively, the variable circuit 40 is controlled by the variance control circuit 46 which monitors the travelling speed of the vehicle and controls the variable circuit 40, appropriately. In this embodiment, the variable circuit 40 will vary the cutoff frequency of the filtering circuit 12 in a proportion driven by the output signal from the variance control circuit 46. The variance control circuit 46 is coupled to either the vehicle's speedometer or to a speed sensor circuit in order to obtain the travelling speed of the vehicle. As will be apparent to those skilled in the art, an algorithm to determine the proportion of variation of the cutoff frequency relative to the travelling speed of the vehicle can be readily determined experimentally for optimum performance of the automatic control circuit of the present invention. As will also be apparent to those skilled in the art, this automatic variance will require additional logic circuitry within the filtering circuit 12. The inclusion of the variable circuit 40 will enhance the performance of the automatic control circuit at various speeds.

The amplifier circuit 14 amplifies the signal received at its input, either from the acoustic sensor as illustrated in FIG. 1A or from the filtering circuit 12 as illustrated in FIG. 1B, to a predetermined level appropriate for the other components within the automatic control circuit 10. The voltmeter circuit 16 measures the signal received from the amplifier circuit 14 or the filtering circuit 12, depending on their order, and converts it to an average or rms voltage value representing the frequency of water drop impacts detected by the acoustic sensor 30. In an alternate embodiment the frequency to voltage converter circuit 17 is included either in place of or in conjunction with the voltmeter circuit 16. The frequency to voltage converter circuit 17 is included to enhance the detection of water drop impacts on the outer casing 28.

The comparator 18 compares the signal received from the voltmeter circuit 16 to a predetermined first threshold value after each sweeping motion of the wipers. If the signal received from the voltmeter circuit 16 is less than the predetermined first threshold value, then the intermittent speed at which the wiper controls are manually set is continued. When the signal received from the voltmeter circuit 16 is equal to or greater than the predetermined first threshold value, the output of the comparator 18 is raised to a logical high voltage level, signalling to the logic control circuit 22 that a signal should be sent to activate a single sweep of the windshield wipers. The single sweep function of the windshield wipers is kept active as long as the signal received from the voltmeter circuit 16 is equal to or greater than the first threshold value, but less than a second threshold value.

The comparator 20 compares the signal received from the voltmeter circuit 16 to the predetermined second threshold value after each sweeping motion of the wipers. If the signal received from the voltmeter circuit 16 is less than the predetermined second threshold value, but more than the first threshold value, then the single sweep function is kept active. When the signal received from the voltmeter circuit 16 is equal to or greater than the second threshold value, the output of the comparator circuit 20 rises to a logical high voltage level. When the logic control circuit 22 detects that both of the outputs of the comparators 18 and 20 are at logical high voltage levels, then the single sweep control signal is deactivated and a signal is sent to activate the continuous fast sweep control function of the wiper controls. The fast sweep control function is kept active as long as the signal from the voltmeter circuit 16 is equal to or greater than the second threshold value.

Once the signal from the voltmeter circuit 16 falls below the second threshold value, the output of the comparator 20 will fall to a logical low voltage level and the logic control circuit 22 will deactivate the continuous fast sweep control function and activate the single sweep control function. When the signal from the voltmeter circuit 16 then falls below the first threshold value, the output of the comparator 18 will fall to a logical low voltage level and the logic control circuit 22 will deactivate the single sweep control function. The windshield wipers will then be controlled by the manual setting and will sweep at the set intermittent speed. While the windshield wipers are set at the intermittent speed, if the signal form the voltmeter circuit 16 rises above the first or second threshold values, the logic control circuit 22 will appropriately activate either the single sweep control function or the continuous fast sweep control function, as necessary. The first and second threshold values will be different for different models of vehicles and the optimum values for each vehicle can be determined experimentally. Once the windshield wipers are not necessary, the operator will switch the manual control to the off setting.

In an alternate embodiment, a water detector can be used to first detect the presence of water on the windshield and automatically switch from the off setting to an intermittent setting thereby activating the automatic control circuit 10 which will then appropriately control the speed of the windshield wipers according to the detected conditions. A signal line 31, as illustrated in FIG. 1B, is coupled between the water detector and the intermittent control 4 to allow the water detector to send a signal which will activate the automatic control circuit 10. This water detector can be of any known design, including a design based on the electric conductivity of water. In such a system, water is detected when it falls on electrical contacts and because of its electrical conductivity thereby closes a circuit. The electrical contacts are then heated to remove, by evaporation, water which has already been detected.

In a further alternate embodiment, instead of a water detector circuit, the automatic control circuit 10 is always active and compares the signal from the voltmeter circuit 16 at predetermined intervals with the previous value of the voltmeter circuit 16. If the signal from the voltmeter circuit 16 increases by a predetermined amount over its previous value then the intermittent speed control function of the windshield wipers is activated.

In these alternate embodiments, when the windshield wipers are automatically activated based on the detection of water, there must be a manual override switch which will prevent the windshield wipers from being automatically activated. This manual override switch can be used to prevent the wipers from activating at times which will be harmful to them and to the vehicle, such as when the vehicle is inside a car wash.

In an alternate embodiment, the windshield wipers can also be automatically deactivated when the windshield is dry. The electric motor of the actuator controls the sweeping motion of the windshield wipers. When the windshield is wet, the wipers move across the windshield with little resistance. However, when the windshield is dry, the wipers move across the windshield with higher resistance. This higher resistance causes the current drawn by the actuator to increase. By monitoring the current drawn by the actuator, using a current measuring peak hold circuit coupled to the wiper actuator, the windshield wipers can be automatically turned off once the actuator current rises above a certain level, signalling that the windshield is dry. The input from the current measuring peak hold circuit is provided to the logic control circuit 22 on the signal line 21. The peak hold circuit is reset at the end of every sweep cycle, with the peak value of the present sweep of the windshield wipers stored and compared with the peak value of the previous sweep of the windshield wipers. In this embodiment, the windshield wipers will be automatically turned off once the peak value of the actuator current from a sweep is greater than the previous sweep's peak value by a predetermined amount, signalling that the windshield is dry. This predetermined amount can be determined experimentally for different vehicle models.

As discussed above, the predetermined first and second threshold values of the comparators 18 and 20 can be changed for different models of vehicles. Alternatively, the comparators 18 and 20 will each include a variable circuit 42 and 44, respectively, as illustrated in FIG. 1B, for the active variation of the first and second threshold values relative to the travelling speed of the vehicle. The travelling speed of the vehicle is input to the variable circuits 42 and 44 from the vehicle's speedometer or a speed sensor circuit on the signal line 26. It should be apparent to those skilled in the art that the variable circuits 42 and 44 can be included in any embodiment of the automatic control circuit 10. Each of the variable circuits 42 and 44 will vary the threshold values according to the travelling speed of the vehicle. Alternatively, the variable circuits 42 and 44 are controlled by the variance control circuit 46 which monitors the travelling speed of the vehicle and controls the variable circuits 42 and 44, appropriately. In this embodiment, the comparators 18 and 20 will vary their respective threshold values in a proportion driven by the output signal from the variance control circuit 46. The variance control circuit 46 is coupled to either the vehicle's speedometer or to a speed sensor circuit in order to obtain the travelling speed of the vehicle. As will be apparent to those skilled in the art, an algorithm to determine the proportion of variation of the threshold values can be readily determined experimentally for optimum performance of the automatic control circuit of the present invention. As will also be apparent to those skilled in the art, this automatic variance will require additional logic circuitry within the comparators 18 and 20. The inclusion of the variable circuits 42 and 44 will enhance the performance of the automatic control circuit at various speeds.

The windshield wiper automatic control system of the present invention monitors the signal from the acoustic sensor representing the frequency of water drop impacts on a surface of the vehicle. Preferably, the frequency of water drop impacts are monitored on the outer casing of a side rear-view mirror. Alternatively, the frequency of water drop impacts can be monitored on other surfaces of the vehicle including the windshield itself. The automatic control system preferably monitors the amplitude of the signal from the acoustic sensor. Alternatively, the automatic control system will monitor both the amplitude and frequency of the signal from the acoustic sensor. The signal from the acoustic sensor is filtered and amplified before it is input to the voltmeter circuit 16. A voltage signal representing the amplitude or the amplitude and frequency of the signal from the acoustic sensor is output from the voltmeter circuit 16, the frequency-to-voltage converter circuit 17 or the parallel combination of the voltmeter circuit 16 and the frequency-to-voltage converter circuit 17, depending on the embodiment. A signal representing the frequency of water drop impacts on the monitored surface is then compared to a first threshold value and to a second threshold value. If the signal rises above the first threshold value, a single sweep function of the windshield wipers is automatically activated. If the signal then rises above the second threshold value, a continuous fast sweep function of the windshield wipers is automatically activated.

The present invention has been described in terms of specific embodiments incorporating details to facilitate the understanding of the principles of construction and operation of the invention. Such reference herein to specific embodiments and details thereof is not intended to limit the scope of the claims appended hereto. It will be apparent to those skilled in the art the modifications may be made in the embodiment chosen for illustration without departing from the spirit and scope of the invention.

I claim:

1. A windshield wiper control apparatus for detecting impacts of water on a vehicle and controlling operation of a windshield wiper comprising:

a. means for generating a signal representative of an amount of water contacting a vehicle by monitoring sound from impacts on a surface of the vehicle; and b. means for operating the windshield wiper in response to a level of the signal.

2. The windshield wiper control apparatus as claimed in claim 1 wherein the means for generating includes an acoustic sensor.

3. The windshield wiper control apparatus as claimed in claim 2 wherein the acoustic sensor is a unidirectional microphone mounted within a plastic casing of a side rear-view mirror on the vehicle.

4. The windshield wiper control apparatus as claimed in claim 3 wherein the acoustic sensor is positioned within a housing mounted within the plastic casing.

5. The windshield wiper control apparatus as claimed in claim 4 wherein a rubber ring is positioned around the acoustic sensor between the acoustic sensor and the housing to mechanically isolate the acoustic sensor.

6. The windshield wiper control apparatus as claimed in claim 2 wherein the acoustic sensor is a unidirectional microphone mounted behind a windshield of the vehicle.

7. The windshield wiper control apparatus as claimed in claim 1 further comprising a filtering circuit coupled to the means for generating and to the means for operating for filtering the signal to isolate noise related to water impacts on the surface.

8. The windshield wiper control apparatus as claimed in claim 7 wherein the filter is a highpass filter.

9. The windshield wiper control apparatus as claimed in claim 7 wherein the filter includes both a highpass filter and a bandpass filter.

10. The windshield wiper control apparatus as claimed in claim 1 further comprising a water detection circuit coupled to the means for operating for detecting a presence of water and activating the means for operating when water is detected.

11. The windshield wiper control apparatus as claimed in claim 10 further comprising a deactivation circuit coupled to the means for operating for detecting when a windshield is dry for a predetermined period of time and deactivating the means for operating.

12. A windshield wiper control apparatus for detecting impacts of water on vehicle and controlling operation of a windshield wiper comprising:

a. means for detecting an amount of water contacting a vehicle by monitoring sound of water impinging on a surface of the vehicle, wherein the means for detecting generates a signal representing an amount of water contacting the vehicle;

b. means for operating the windshield wiper when a level of the signal rises above a predetermined threshold level.

13. The windshield wiper control apparatus as claimed in claim 12 wherein the means for detecting includes an acoustic sensor.

14. The windshield wiper control apparatus as claimed in claim 12 further comprising a filtering circuit coupled to the means for detecting and to the means for operating for filtering the signal to isolate noise related to water impacts.

15. The windshield wiper control apparatus as claimed in claim 14 wherein the filter circuit has a cutoff frequency which is automatically varied based on a travelling speed of the vehicle.

16. A method of controlling operation of a windshield wiper comprising the steps of:

a. detecting an amount of water contacting a vehicle by monitoring sound beneath a surface of the vehicle;

b. generating a signal representative of the amount of water detected; and c. operating the windshield wiper in response to a level of the signal.

17. The method as claimed in claim 16 wherein the step of detecting is completed using an acoustic sensor for monitoring sound.

18. The method as claimed in claim 17 wherein the acoustic sensor is a unidirectional microphone mounted within a plastic casing of a side rear-view mirror on the vehicle.

19. The method as claimed in claim 17 wherein the acoustic sensor is a unidirectional microphone mounted behind a windshield of the vehicle.

20. The method as claimed in claim 16 further comprising the step of filtering the signal to isolate noise related to water impacts.

21. The method as claimed in claim 16 further comprising the steps of:

a. detecting a presence of water; and b. enabling the step of operating when water is detected.

22. The method as claimed in claim 21 further comprising the step of deactivating the step of operating when water is not detected.

23. The method as claimed in claim 22 wherein the step of deactivating includes monitoring a level of current from a peak hold circuit, wherein the level of current represents an amount of friction experienced by the windshield wiper across a windshield.

24. A method of controlling operation of a windshield wiper comprising the steps of:

a. audibly detecting a frequency of impacts on a surface of a vehicle;

b. generating a first signal representative of the frequency of impacts on the surface;

c. filtering the first signal to isolate only the frequency of impacts on the surface due to water drops, thereby creating a second signal;

d. comparing the second signal to a predetermined threshold value; and e. automatically operating the windshield wiper when the second signal exceeds the predetermined threshold value.

25. The method as claimed in claim 24 further comprising the steps of:

a. determining a travelling speed of the vehicle; and b. automatically varying the predetermined threshold value based on the speed of the vehicle.

* * * * *